United States Patent [19]

Jacus

[11] Patent Number: 5,034,291
[45] Date of Patent: Jul. 23, 1991

[54] ALUMINUM COMPOUND ADDITIVES TO REDUCE ZINC CORROSION IN ANODES OF ELECTROCHEMICAL CELLS

[75] Inventor: Robert J. Jacus, Madison, Wis.

[73] Assignee: Rayovac Corporation, Madison, Wis.

[21] Appl. No.: 394,651

[22] Filed: Aug. 16, 1989

[51] Int. Cl.$^5$ .............................................. H01M 4/42
[52] U.S. Cl. ..................... 429/206; 429/229; 252/182.1
[58] Field of Search ............... 429/206, 207, 229, 230; 252/182.1

[56] References Cited

U.S. PATENT DOCUMENTS

| | | | |
|---|---|---|---|
| 2,829,189 | 4/1958 | Coleman et al. | 429/207 |
| 2,994,625 | 8/1961 | Mendelsohn et al. | 429/207 |
| 3,553,027 | 1/1971 | Oswin et al. | 429/207 |
| 3,580,740 | 5/1971 | James | 429/229 |
| 3,905,833 | 9/1975 | Louzous | 429/207 |
| 4,735,876 | 4/1988 | Miura et al. | 429/229 |

*Primary Examiner*—Donald L. Walton
*Attorney, Agent, or Firm*—Kenyon & Kenyon

[57] ABSTRACT

In accordance with the present invention, an electrochemical cell is disclosed comprising a metal oxide cathode; an anode/electrolyte mixture which contains a zinc anode material and an aluminum compound additive as an source of aluminum ions (e.g., an aluminum salt). The anode/electrolyte mixture may also contain a source of sulfate ions (e.g., a metal sulfate). The anode/electrolyte mixture can also include a suitable carrier (e.g., gelling agent, buffer) for admixing the various components of the mixture.

19 Claims, 7 Drawing Sheets

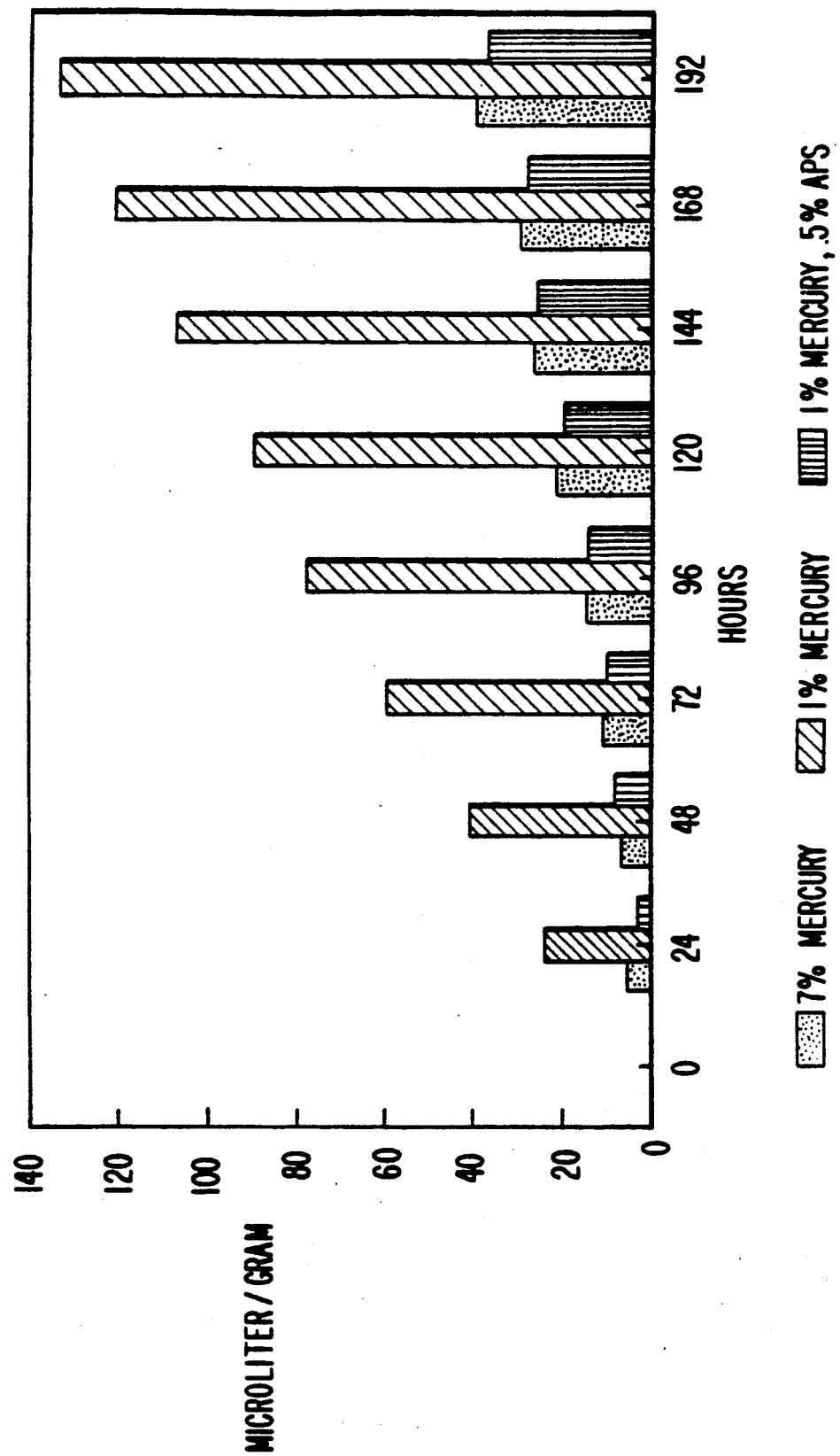

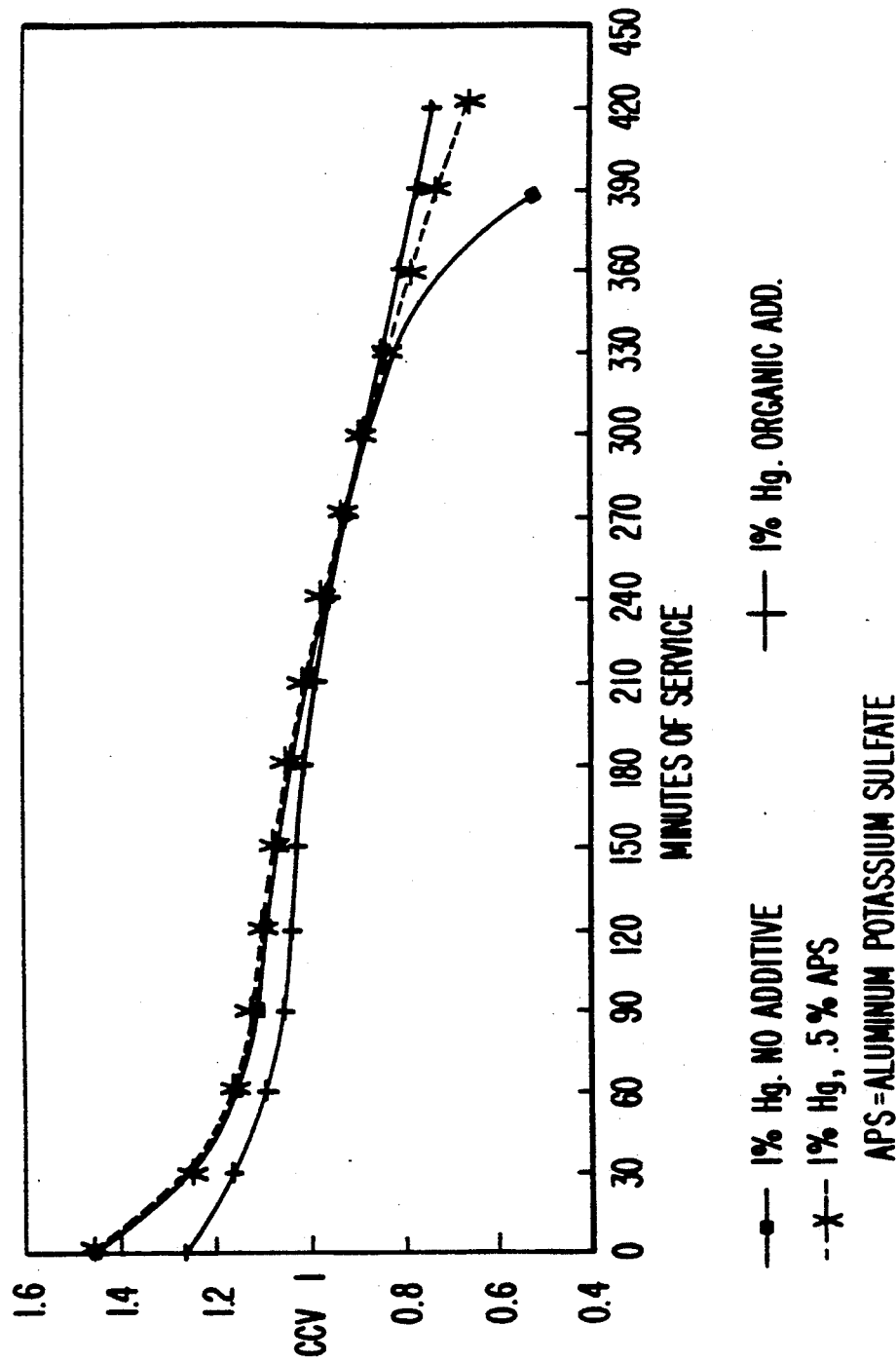

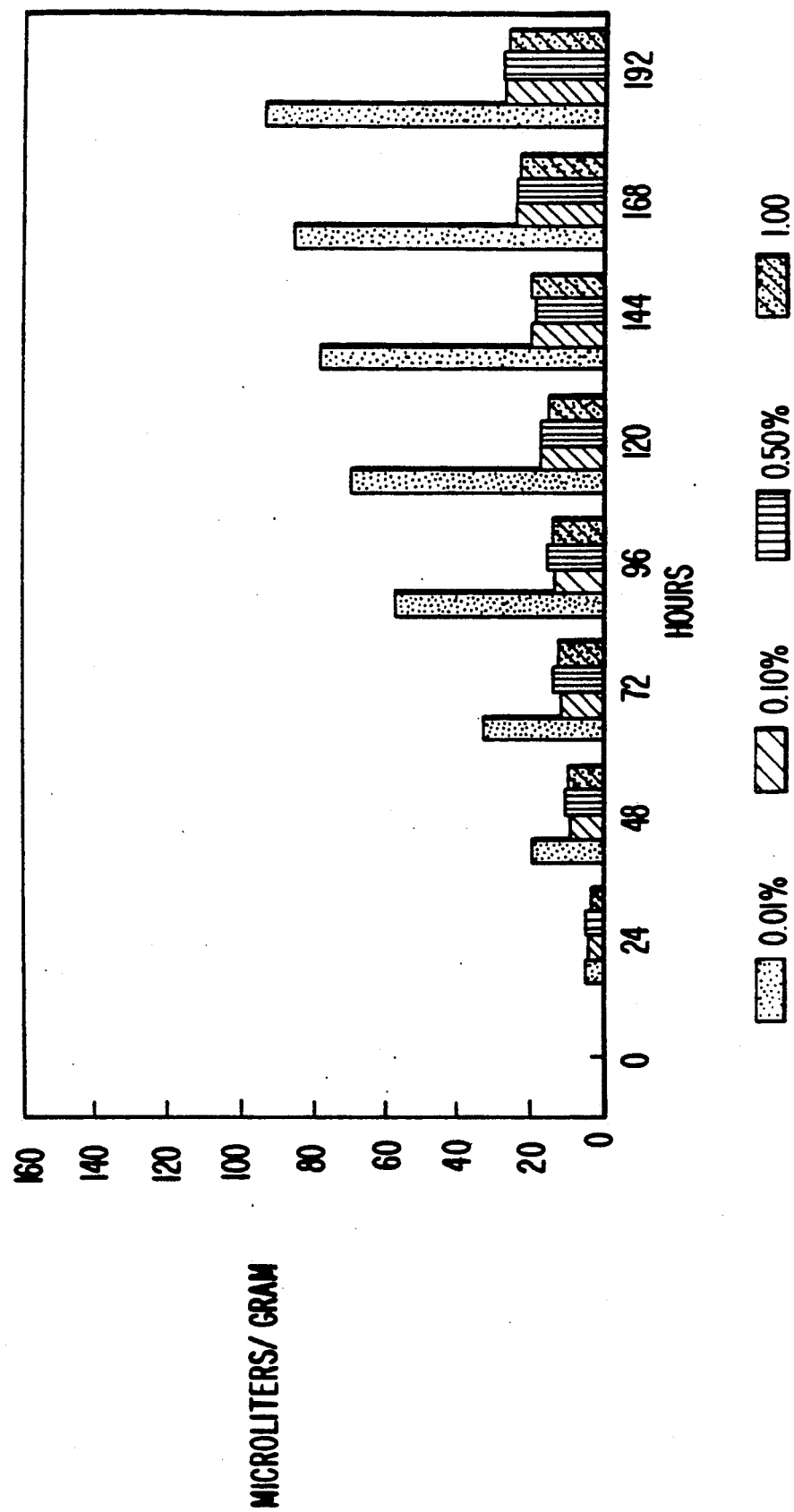

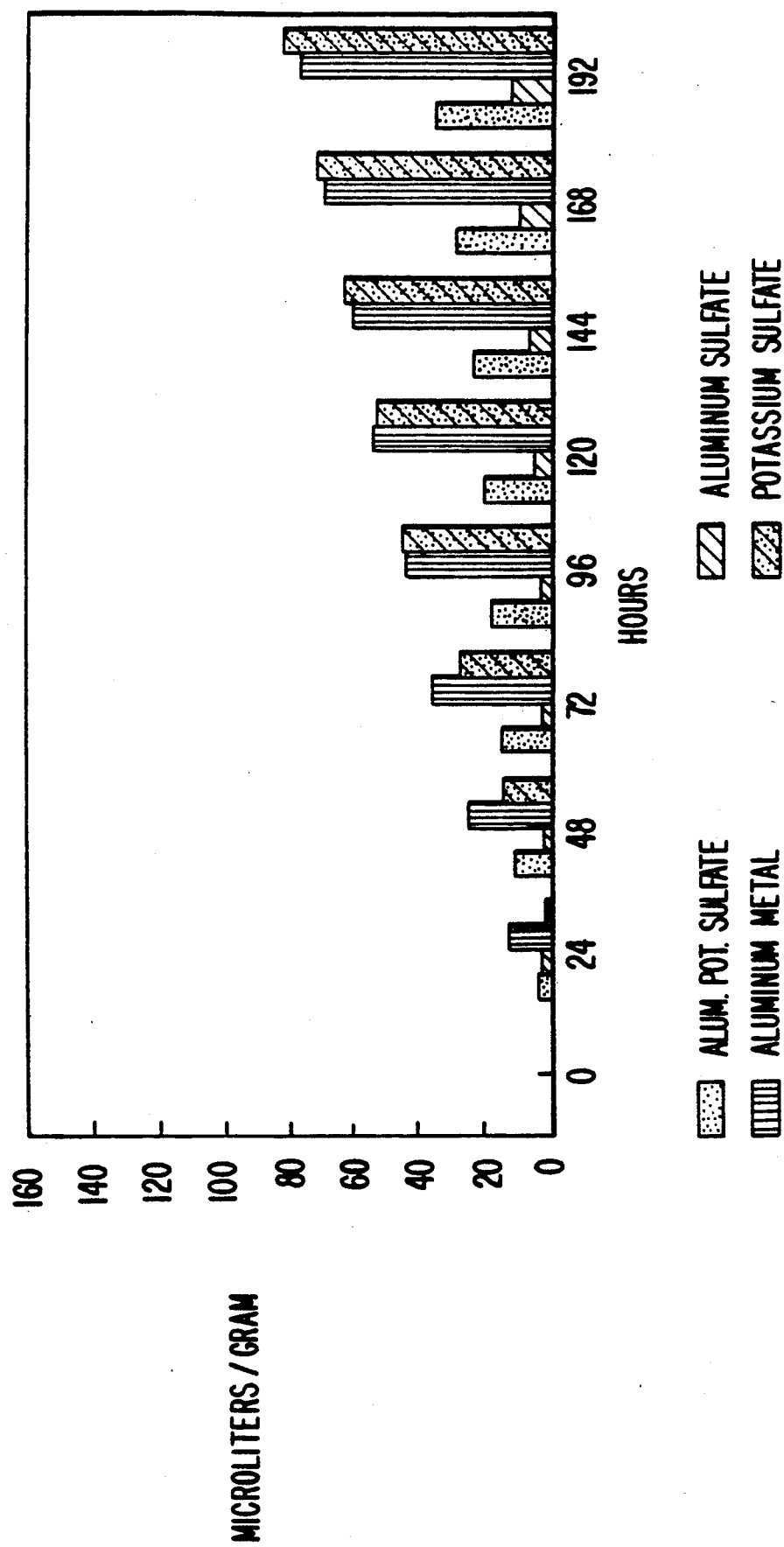

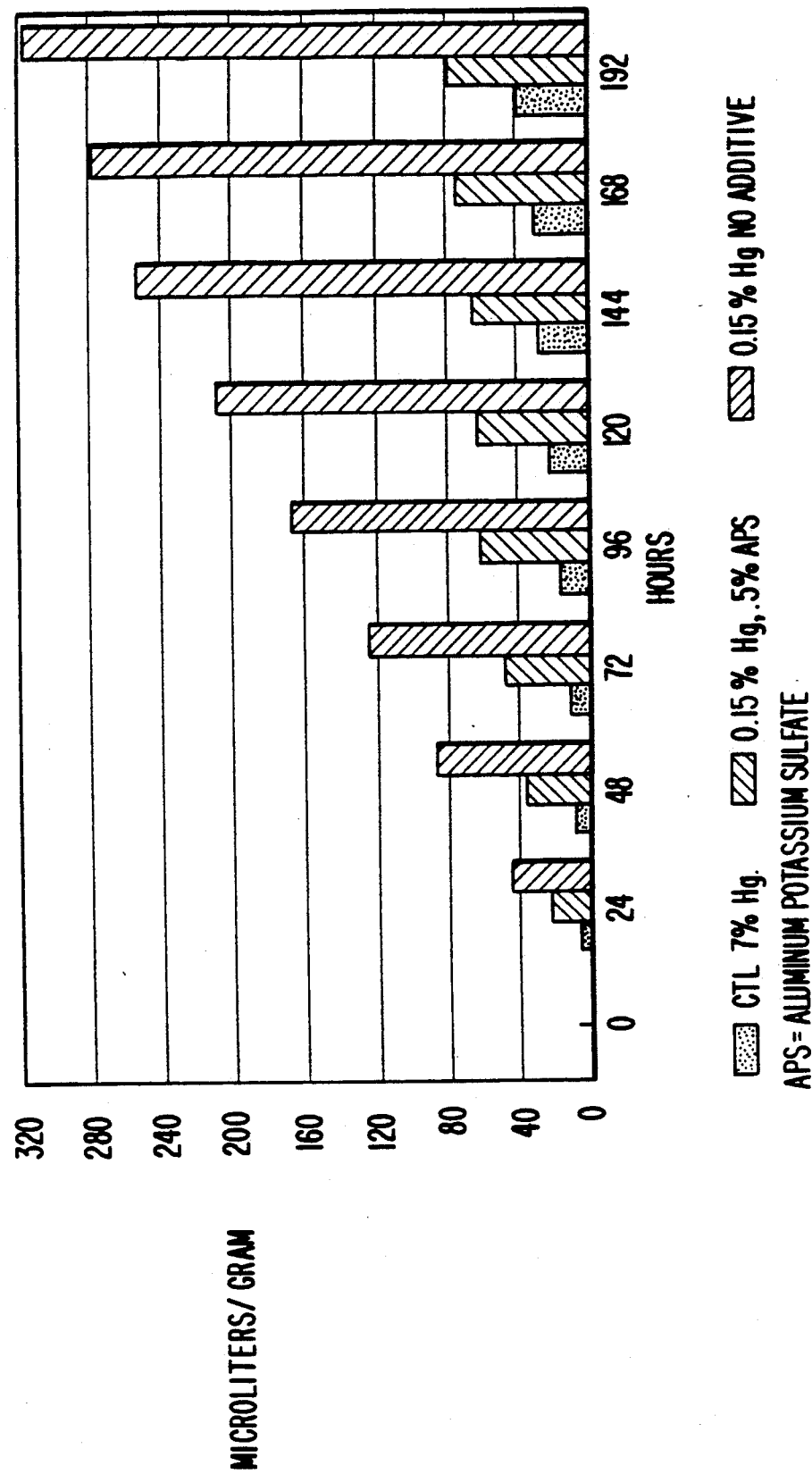

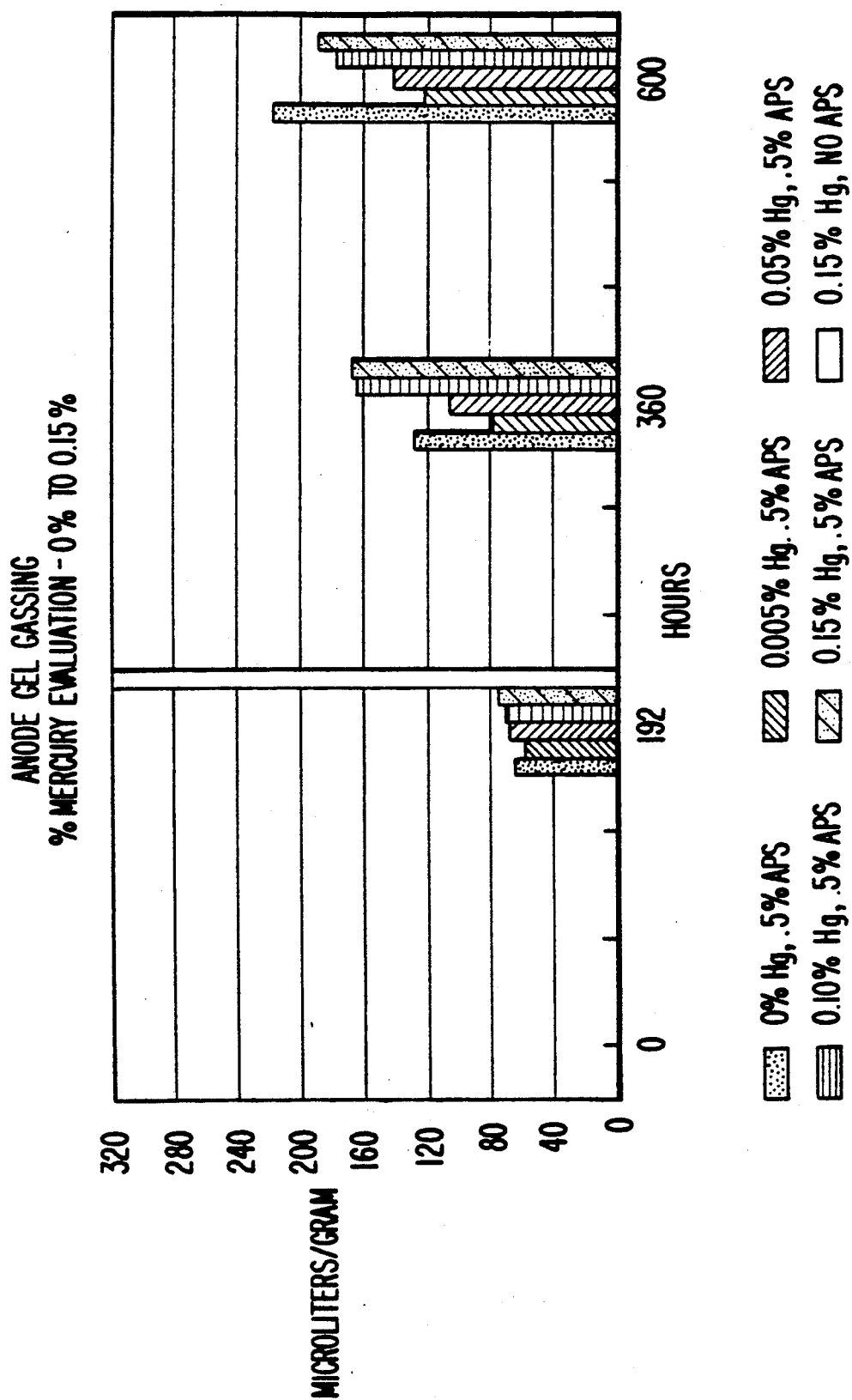

ALUMINUM COMPOUND ADDITIVES TO REDUCE ZINC CORROSION IN ANODES OF ELECTROCHEMICAL CELLS

FIELD OF THE INVENTION

The present invention relates generally to the construction of electrochemical cells employing a zinc electrode and an alkaline electrolyte.

BACKGROUND OF THE INVENTION

Metal oxide primary cells are generally constructed from a pressed metal oxide (e.g., manganese dioxide) cathode, an anode material prepared from zinc powder and an alkaline electrolyte. Usually, the zinc powder is dispersed with the electrolyte in a gel such that more surface area of zinc is available for current production. All of these components are combined within an appropriate casing or housing.

In a typical cell as shown in FIG. 1, the positive current collector is a drawn steel container (2), open on one end and about 0.010 inches thick. The cathode consists of two or more annular rings (5) comprised of a compressed mixture of electrolytic manganese dioxide, graphite and alkaline electrolyte which are placed in contact with the positive current collector. A bead (10) is formed into the container near the open end to support the sealing disk. A separator (4) is placed between the cathode rings and the anode gel (3) which is comprised of powdered zinc, a gelling agent, the electrolyte and mercury. A sealing disk (6) contains a negative current collector (1). The sealing disk (6) and sealant (15), which is applied to the sealing disk or to the container (2), are placed into the open end of the container and in contact with the bead. The open end of the container is crimped over the sealing disk thus compressing it between the crimp of the container on to which the coating (14) has been applied and the bead to seal the cell. An insulation washer (7) with a central aperture is placed over the crimped end of the cell such that the end of the negative current collector (1) protrudes through the aperture. A contact spring (8) is affixed to the end of the negative current collector (1). Terminal caps (9) and (13) are placed into contact with the contact spring (8) and the positive current collector (2), respectively, and an insulating tube (12) and steel shell (11) are placed around the cell and crimped on their ends to hold the terminal caps in place.

Zinc powder is the basic component used to manufacture the anode of primary alkaline cells. The zinc anode is employed in an alkaline solution such as an aqueous potassium hydroxide or sodium hydroxide electrolyte. However, exposure of the zinc to hydroxide ions causes zinc corrosion which results in production of hydrogen gas which may build up.

To minimize zinc corrosion, it has been the practice in the battery industry to use amalgamated zinc in forming the anode. Particularly, amalgamation of zinc with mercury has been found to successfully reduce corrosion and gas build up. Most commercially produced metal oxide cells contain 1%-7% mercury (relative to the weight of zinc).

However, due to the environmental hazard presented by mercury contained in disposed cells, reduction of the amount of mercury in alkaline cells has been an industrial goal. After discharge, cell contents sometimes leak out of the cell as a result of internal gas buildup from electrochemical reactions. Cell contents can also be released when the cell structure is opened or ruptured during or after disposal. As a result, mercury in the cell contents is released and can then be absorbed into the environment. Therefore, reduction of the amount of mercury in such cells will reduce the risk of significant environmental contamination if the cell contents are released.

Many approaches to eliminating the need for mercury have been pursued. In U.S. Pat. No. 4,777,100 corrosion is reduced in aqueous electrochemical cells having zinc anodes comprised of single crystal zinc particles by the addition of small amounts of a gas inhibiting surfactant (e.g., an organic phosphate inhibitor). Published Japanese Patent Application 6084767 (filed Oct. 14, 1983, Matsushita Electric Industrial Co., Ltd.) discloses a zinc alkaline cell which employs a zinc/aluminum alloy with aluminum content 0.02 to 0.50 wt % as mean for reducing mercury levels. Another Matsushita article (Ogawa, "Development of Corrosion Resistance Zinc Alloy and Its Application in Alkaline Dry Battery") and three Matsushita abstract references (Chem. Abs. 110: 216342a, 216343b and 216344c) suggest using indium, thallium, gallium, cadmium, lead, silver, bismuth, calcium, strontium, barium, mercury, silicon and tin as other alloying elements.

However, the addition of organic additives adversely effects cell performance by decreasing cell operating voltage. Furthermore, forming zinc alloys containing aluminum or other materials can significantly add to the complexity and expense of producing anode materials. It would, therefore, be desirable to provide means for reducing zinc anode corrosion while significantly decreasing mercury content without significantly diminishing cell performance or increasing the complexity or expense of manufacturing such cells.

SUMMARY OF THE INVENTION

In accordance with the present invention, an electrochemical cell is disclosed comprising an anode/electrolyte mixture. The anode/electrolyte mixture contains a zinc anode material (such as a zinc/mercury amalgam) and an aluminum compound additive as a nonmetallic source of aluminum ions (for example an aluminum salt). The anode/electrolyte mixture may also contain a metal sulfate or some other source of sulfate ions. In certain embodiments, the aluminum compound additive is aluminum potassium sulfate or aluminum sulfate, preferably at a concentration of at least 0.1 weight percent. The anode/electrolyte mixture can also include suitable carriers such as gelling agents and buffers for admixing the various components of the mixture. Electrochemical cells are constructed using the anode/electrolyte mixtures in accordance with standard practices in the art.

The anode/electrolyte mixtures described herein are useful for constructing various types of cells, other than metal oxide cells, that employ a zinc electrode and an alkaline electrolyte, including without limitation zinc-air cells.

BRIEF DESCRIPTION OF THE FIGURES

FIG. 2 is a graph summarizing the comparative gassing rates of an anode/electrolyte mixture prepared in accordance with the present invention, a control mixture containing no aluminum compound additive and a high mercury sample (7% mercury) containing no additive.

FIG. 3 is a graph summarizing the comparative discharge of an anode/electrolyte mixture prepared in accordance with the present invention, a control mixture containing no aluminum compound additive and a mixture containing an organic additive material.

FIG. 4 is a graph summarizing the comparative gassing rates of an anode/electrolyte mixture prepared in accordance with the present invention and containing varying concentrations of aluminum compound additive.

FIG. 5 is a graph summarizing the comparative gassing rates of an anode/electrolyte mixture prepared in accordance with the present invention and containing various aluminum compound additives.

FIG. 6 is a graph summarizing the comparative gassing rates of an anode/electrolyte mixture prepared in accordance with the present invention having very low levels of mercury and control mixtures containing no aluminum compound additive.

FIG. 7 is a graph summarizing the comparative gassing rates of anode/electrolyte mixtures prepared in accordance with the present invention and containing varying low level concentrations of mercury.

DETAILED DESCRIPTION OF THE INVENTION

Figure 1:
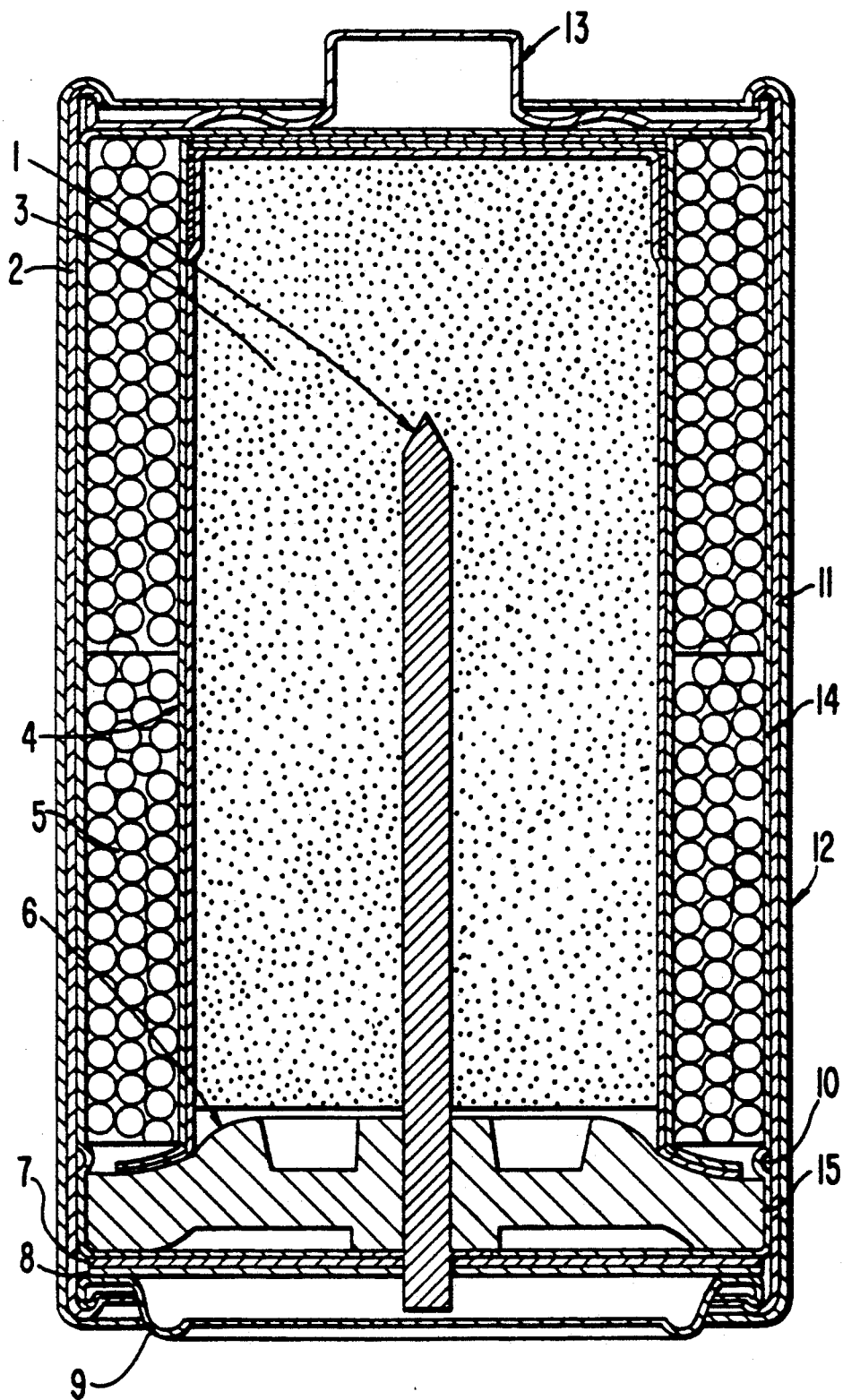
FIG. 1 is a cutaway view of a typical metal oxide cell.

It has been found that the amount of mercury needed to minimize zinc corrosion in an alkaline cell can be significantly reduced by the addition of an aluminum salt to the anode material containing zinc powder. Aluminum sulfate salts, such as aluminum potassium sulfate (AlK(SO$_4$)$_2$·12H$_2$O) and aluminum sulfate (Al$_2$(SO$_4$)$_3$·18H$_2$O), are most effective in reducing hydrogen gas production resulting from zinc corrosion. Furthermore, adding these aluminum compounds to alkaline cells have shown surprisingly improved electrical discharge performance.

Anode/electrolyte mixtures in accordance with the present invention were made by two different methods—a "wet" method and a "dry" method. In the wet method, dry zinc powder and the powdered aluminum compound were mixed. The electrolyte solution was then added and thoroughly mixed with the powdered mixture. The desired quantity of mercury was then added and mixed with moderate agitation to form the amalgam. Finally, the gelling agent was added and mixed with vigorous agitation. In the dry method, the powdered zinc, aluminum compound and gelling agent were combined and mixed dry. The desired amount of mercury was then added and mixed with moderate agitation. Finally, the electrolyte solution was added and the entire mixture was vigorously agitated.

The gassing characteristics of various anode/electrolyte mixtures was tested as follows. Six replicates of 10–15 g of the anode material were weighed out for each mixture to be tested and placed into test tubes. Each tube was closed with a serum bottle stopper and filled with paraffin or mineral oil. The tapered end of a 5 ml pipette was then placed snugly into the hole in the serum bottle stoppers until the paraffin/oil level reached approximately 3.5 ml on the pipette. The test tube was then placed in a water bath at a set temperature of 71° C. Beginning after at least 30 minutes and each day thereafter for at least 8 days, the volume of gas produced inside the tubes (i.e., the change in the volume reading on the pipette) was determined. The gassing rate (in ul/g/day) was calculated by dividing the change in volume of the pipette reading by the number of grams of gel, dividing again by the number of days that readings were recorded, and then multiplying by 1000. The rates for all six replicates for each sample were then averaged.

The following examples are only illustrative of the present invention. Although specific electrolyte compositions and gelling agents are employed in the examples, other electrolyte compositions and gelling agents known to those skilled in the art can be used in practicing the present invention. Various zinc alloys can also be used as the anode material. Particular examples described below employ unalloyed zinc and an indium zinc alloy. However, other zinc alloys known to those skilled in the art can be employed as desired.

EXAMPLE 1

Anode/electrolyte mixtures containing 1% mercury by weight of zinc were formulated as follows for comparison with commercial production samples of anode/electrolyte mixtures (containing 7% mercury). Values are listed as weight percent relative to the weight of the entire composition.

|  | Control | Test Sample |
| --- | --- | --- |
| powdered indium zinc alloy | 63.44 | 63.12 |
| mercury | 0.64 | 0.6 |
| electrolyte | 35.52 | 35.35 |
| gelling agent | 0.40 | 0.40 |
| aluminum potassium sulfate | — | 0.50 |

The indium zinc contained 150 ppm indium by weight of zinc. The electrolyte was a mixture of 38 weight % potassium hydroxide, 3 weight % zinc oxide and water. The gelling agent was an acrylic acid polymer (commercially available from B. F. Goodrich as Carbopol 941).

The control and test sample were tested for gassing as described above. The test sample gassing rate was approximately 3 ul/gm/day as compared with approximately 9 and 5 ul/gm/day for the control sample and previously tested commercial production samples containing 7% mercury (by weight of zinc), respectively. FIG. 2 summarizes the gassing profile for each sample over a period of 8 days. In all instances, the sample prepared in accordance with the present invention produced less gas than the 1% Hg sample control and was comparable to the 7% Hg commercial production sample.

Alkaline cells were prepared using the control and test sample anode/electrolyte mixtures described above. Open circuit voltage ("OCV"), closed circuit voltage ("CCV") and flash amperage ("AMP") of such cells were measured. The results were as follows:

|  | Control | Test Sample |
| --- | --- | --- |
| OCV (volts) | 1.565 | 1.563 |
| CCV (volts) | 1.480 | 1.495 |
| AMP (amps) | 9.410 | 9.563 |

OCV of the test sample was not markedly changed in comparison with the 1% Hg control sample, while CCV and amperage increased in the test sample. As shown in FIG. 3, 3.9 ohm discharge of the test sample was comparable to the control at upper voltages and actually showed approximately a 12% increase (to 0.75 v) ending at 415 minutes.

EXAMPLE 2

Two additional lots of test sample anode/electrolyte mixture were prepared as described in Example 1. Gassing rates for these lots were 2.02 and 1.49 ul/gm/day. Again, the gassing rates were significantly less than previous values for 1% Hg control samples and comparable to 7% Hg commercial production samples.

EXAMPLE 3

Four lots of test sample anode/electrolyte mixture were prepared as described in Example 1, except that the lots contained 0.01%, 0.10%, 0.50% and 1.00% aluminum potassium sulfate, respectively. Gassing rates were tested and recorded as 11.83, 3.44, 3.50 and 3.34 ul/gm/day, respectively. FIG. 4 summarizes the gassing of the four lots over a period of 8 days. 0.01% aluminum potassium sulfate produced a minimum reduction in gassing as compared to control and still greater when compared with commercial production 7% Hg samples. 1.00% aluminum potassium sulfate still provided gassing reduction, but did not exhibit any significant advantage over lower concentrations.

EXAMPLE 4

A first lot of test sample anode/electrolyte mixture was prepared in accordance with the present invention as described in Example 1. Second, third and fourth lots were similarly prepared, except that the aluminum potassium sulfate was substituted with aluminum sulfate (0.39%) in the second lot, aluminum metal (0.03%) in the third lot and potassium sulfate (0.40%) in the fourth lot. Gassing rates for the first, second, third and fourth lots were 4.45, 1.63, 9.64 and 10.44 ul/gm/day, respectively. FIG. 5 summarizes the gassing of the four lots over a period of 8 days. The lack of gassing reduction upon addition of potassium sulfate indicates that the presence of aluminum ions is required. Finally, the reduction in gassing observed upon addition of aluminum sulfate indicates that potassium ions are not required to achieve the desired prophylactic effect.

EXAMPLE 5

A test sample anode/electrolyte mixture in accordance with the present invention was formulated using zinc (without indium), only 0.15 weight % mercury (relative to the weight of zinc) and 0.5 weight % aluminum potassium sulfate (relative to the weight of the mixture). Gelling agent and electrolyte were added as before. A similar control mixture was made with the same formula except the aluminum potassium sulfate was omitted. The gassing rates of these mixtures were compared with the gassing rate of a preparation containing 7.0 weight % mercury. FIG. 6 summarizes the results of the comparison over a period of 8 days. Addition of aluminum potassium sulfate significantly decreased the gassing rate as compared to the 0.15% mercury control. The test sample showed a higher gassing rate as compared to test samples described in the previous examples. However, this is due to the fact that the mercury content was further reduced to 0.15% as compared to 1% in previous examples. The instant test sample still exhibited significant reduction in gassing as compared to the low mercury control containing no additive.

EXAMPLE 6

Five lots of test sample anode/electrolyte mixture were prepared as described in Example 5, except that the lots contained 0%, 0.005%, 0.05% and 0.10% and 0.15% mercury, respectively. A similar control mixture was made with 0.15% mercury and no aluminum potassium sulfate. Gassing data over a period of 25 days are shown in FIG. 7. At all levels of mercury tested, the mixtures of the present invention showed improvement over the control mixture.

From the foregoing it will be apparent to those skilled in the art that various modifications in the above-described devices can be made without departing from the scope and spirit of the invention. Accordingly, the invention may be embodied in other specific forms without departing from the spirit or essential characteristics thereof. Present embodiments, therefore, are to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An electrochemical cell comprising an alkaline anode/electrolyte mixture, said anode/electrolyte mixture comprising zinc anode material containing less than 1% mercury by weight of zinc and a source of aluminum ions.

2. The electrochemical cell of claim 1 wherein said anode material comprises an amalgam of zinc and mercury.

3. The electrochemical cell of claim 1 wherein said anode material comprises an amalgam of indium zinc and mercury.

4. The electrochemical cell of claim 2 wherein said amalgam contains about 0.15% mercury.

5. The electrochemical cell of claim 2 wherein said source of aluminum ions is an aluminum salt.

6. The electrochemical cell of claim 5 wherein said aluminum salt is selected from the group consisting of aluminum potassium sulfate and aluminum sulfate.

7. The electrochemical cell of claim 6 wherein said aluminum salt is aluminum potassium sulfate.

8. The electrochemical cell of claim 6 wherein said aluminum salt is aluminum sulfate.

9. The electrochemical cell of claim 1 wherein said anode/electrolyte mixture further comprises a source of sulfate ions.

10. The electrochemical cell of claim 9 wherein said source of sulfate ions is selected from the group consisting of aluminum potassium sulfate and aluminum sulfate.

11. The electrochemical cell of claim 10 wherein said aluminum salt is aluminum potassium sulfate.

12. The electrochemical cell of claim 10 wherein said aluminum salt is aluminum sulfate.

13. The electrochemical cell of claim 7 or 11 wherein said aluminum potassium sulfate is present in a concentration of from about 0.10 to 1.0 weight percent relative to the weight of said anode/electrolyte mixture.

14. The electrochemical cell of claim 13 wherein said aluminum potassium sulfate is present in a concentration of about 0.50 weight percent.

15. The electrochemical cell of claim 8 or 12 wherein said aluminum sulfate is present in a concentration of from about 0.10 weight percent to 1.0 weight percent relative to the weight of said anode/electrolyte mixture.

16. The electrochemical cell of claim 15 wherein said aluminum sulfate is present in a concentration of about 0.39 weight percent.

17. A composition comprising an alkaline electrolyte, zinc anode material containing less than 1% mercury by weight of zinc and a source of aluminum ions.

18. The composition of claim 17 wherein said anode material comprises an amalgam of zinc and mercury.

19. The composition of claim 17 wherein said source of aluminum ions is an aluminum salt.

* * * * *

UNITED STATES PATENT AND TRADEMARK OFFICE
CERTIFICATE OF CORRECTION

PATENT NO. : 5,034,291

DATED : July 23, 1991

INVENTOR(S) : Robert J. Jacus

It is certified that error appears in the above-identified patent and that said Letters Patent is hereby corrected as shown below:

On the Title page

In the Abstract, col. 5, before "source" change "an" to --a--.

Column 2, line 18, change "mean" to --means--.

Column 2, line 28, change "effects" to --affects--.

Column 4, line 29, change "mercury 0.64 0.6" to --mercury 0.64 0.63--.

Column 4, line 43, "9" should not be in boldface.

Column 6, line 7, "0.15%" should not be in boldface.

Signed and Sealed this

Twenty-third Day of February, 1993

Attest:

STEPHEN G. KUNIN

Attesting Officer

Acting Commissioner of Patents and Trademarks